(12) United States Patent  (10) Patent No.: US 6,406,154 B1
Chen  (45) Date of Patent: Jun. 18, 2002

(54) REARVIEW MIRROR WITH AUTOMATIC MODIFICATION

(76) Inventor: Fu-Jeng Chen, 4F-1, No.5, Lane 250, Sec.5, Nan Ching E. Rd., Taipei (TW)

( * ) Notice: Subject to any disclaimer, the term of this patent is extended or adjusted under 35 U.S.C. 154(b) by 0 days.

(21) Appl. No.: 09/788,357

(22) Filed: Feb. 21, 2001

(51) Int. Cl.[7] .............................. G02B 5/08; G02B 7/18
(52) U.S. Cl. ...................................... 359/843; 359/877
(58) Field of Search ................................ 359/843, 872, 359/876, 877; 248/476, 479

(56) References Cited

U.S. PATENT DOCUMENTS 4,679,158 A * 7/1987 Tate ............................ 364/559
5,085,504 A * 2/1992 Jensen ......................... 359/843
5,132,851 A * 7/1992 Bomar et al. ................ 359/843

* cited by examiner

*Primary Examiner*—Mark A. Robinson
(74) *Attorney, Agent, or Firm*—Nath&Associates PLLC; Harold L. Novick (57) ABSTRACT

The present invention provides for improved rearview mirror device for the use. Rearview mirror device of the present invention is likely to be particularly useful in ground vehicle, such as car or truck for better driving view since it automatically modifies the angle to provide a safety-view for driver during the vehicle turning. In one preferred embodiment, an automatic mirror angle modifying device comprises: a rearview mirror, which is supported on a vehicle body; an shaft rotation measurement device, which further includes a ring apparatus which surrounds the steering wheel shaft and a ring apparatus decoder; a microprocessor and a motor. While the steering wheel is rotating to indicate to vehicle body turning, the measuring device detects the shaft rotation angle. Then, according to the rotation angle, the microprocessor computes the best rear view angle and informs the motor to drive the mirror to an adequate position.

33 Claims, 11 Drawing Sheets

REARVIEW MIRROR WITH AUTOMATIC MODIFICATION

FIELD OF THE INVENTION

The present invention relates to rearview mirror device of vehicle and more particularly to rearview mirror device with automatic rearview mirror position modification.

BACKGROUND OF THE INVENTION

Figure 1:
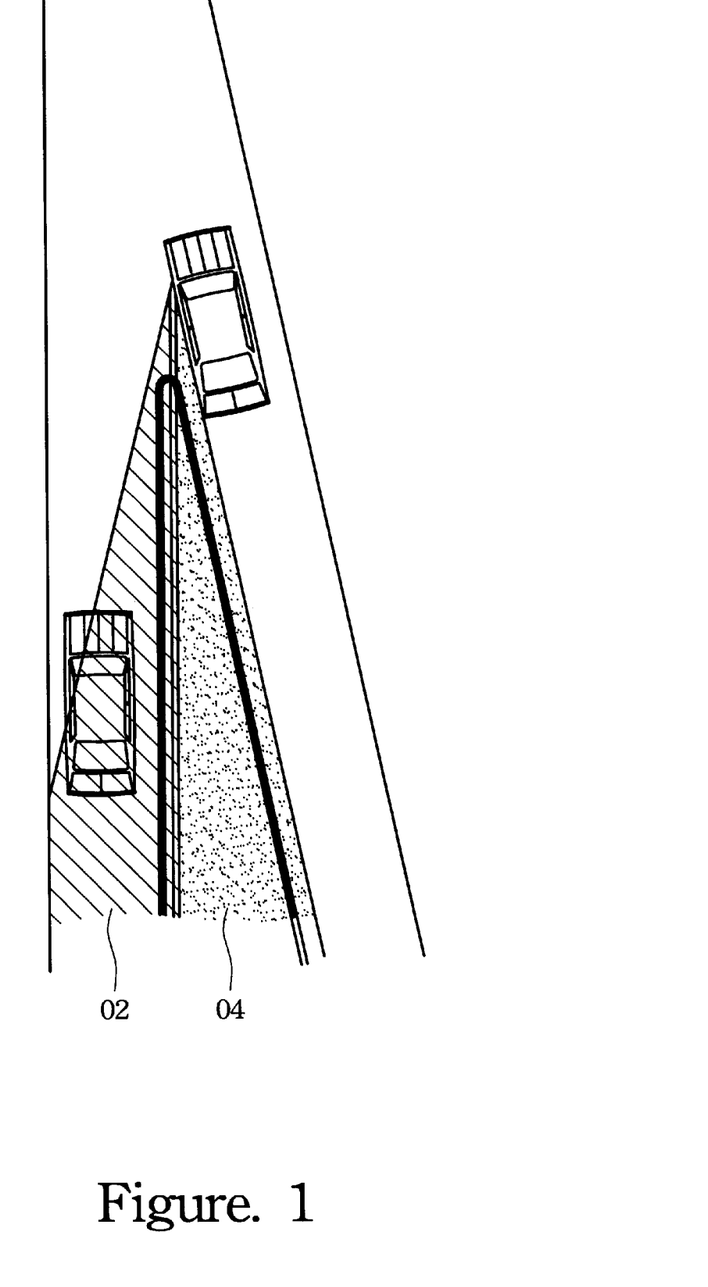
FIG. 1 schematically depicts driver's rearview either the rearview mirror is shifted or not.

It is well-known that outside mounted rearview mirrors have the disadvantage of leaving the driver of a vehicle with a "Blind Spot" between the field-of-view of the mirror and the beginning of a driver's peripheral version. Objects such as other motor vehicles in the blind spot can not be seen by driver, as shown in FIG. 1, which creates the potential for a serious accident while changing lane or merging with traffic. Spot area 02 is the rearview before changing rearview mirror angle; she shadow are 04 is the rearview if the rearview mirror angle is changed correctly. One common method for overcoming this problem is for the driver to glance over his/her shoulder at the blind spot to check for other vehicles. An obvious drawback of this method is that the driver is not watching where he/she is going for a short period of time. Another proposed solution has been the use of convex mirrors to effectively eliminate the blind spot. However, convex mirrors produce a considerable amount of image distortion and make objects look farther away than they really are. This can be more dangerous than having a blind spot, since the driver is lure into a false sense of security.

Rearview mirror automatic adjustment methods have been illustrated for decades, such as in substance to U.S. Pat. No. 3,761,164 filed Mar. 27, 1972; U.S. Pat. No. 3,536,382 filed Oct. 27, 1970; U.S. Pat. No. 3,527,528 Filed Sep. 8, 1970; and U.S. Pat. No. 3,640,609 Filed Feb. 8, 1972. These prior arts temporarily shifting outside rearview mirrors to a wider viewing-angle position in response to movement of the steering wheel.

Moreover, another problem with these mirrors is that if they are shifted too far, the driver of the vehicle is left with a new blind spot in an area between the outside edge of the unshifted mirror viewing field beyond their point of intersection. Thus, an object in this location would be invisible to the driver before and after the shift. A known solution is to regulate the shift of the mirror so that the outside edge of the shifted mirror viewing field ad the inside edge of the shifted mirror viewing field are approximately parallel to each other when the mirror is in its shifted position(German Offenlegunfschrift No. 30 41 426). Another problem now arises in that the degree of shift of the mirror, which will ensure such a parallel relationship, varies according to the angle of the mirror plane relative to the vehicle body, which must be adjusted to accommodate different sizes of drivers. The prior are solution are only viable for a set angle if the mirror plane relative to the vehicle body, and do not allow for programmed adjustment. For instance, in U.S. Pat. No. 5,097,362 Filed Aug. 20, 1990 "Rearview Mirror targeting and Repositioning System" allow rearview mirrors change to the same angle to another reposition if the directional signal which is been turned on. It does not provide drivers constant proper rearview.

SUMMARY OF THE INVENTION

Accordingly, it is an object of the present invention to provide a reliable programming method for automatic modifying rearview mirror angle to the better position in vehicle body. The modification of rearview mirror position is based on the turning angle of vehicle body. The modified rearview mirror angle allows drivers having a required safety view logically.

It is also an object to the present invention to acknowledge the vehicle turning by measuring the pivot of steering wheel shaft in non-mechanical method, such as bar code, sensor or mesh light-receiver.

These and other objects which will becomes apparent upon a reading of the following specification and claims, are accomplished by way of a automatic programmed modified rearview mirror means comprising a rearview mirror, shaft pivot measurement device, a microprocessor and a motor. The rearview mirror is supported on the side of vehicle body. During the steering wheel shaft is rotating for changing the vehicle direction, a ring device of the shaft rotation measurement device, surrounded around the shaft, is moving and a ring device decoder can read the movement. This movement message is computed by the microprocessor to understand the vehicles turning angle and undermine the best proper position for the rearview mirror. The next, the motor drivers the rearview mirror to position and vehicle driver has thee best rear view all the time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
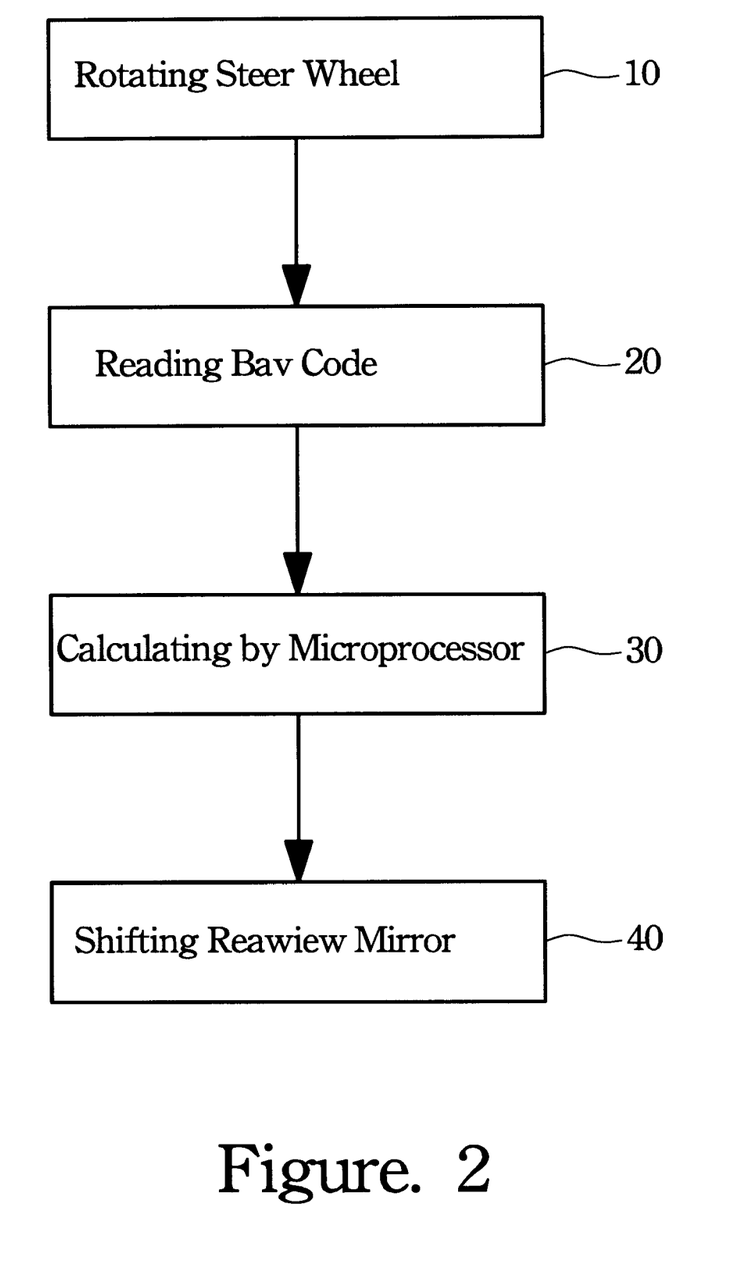
FIG. 2 is the process flowchart of the present invention.

Referring to FIG. 2 to FIG. 6, it is described for the bar-code type embodiment of the present invention. The procedure of utilizing bar-code type of shaft rotation measuring device in steering wheel shaft as shown in FIG. 2, and please also referring to FIG. 3A and FIG. 3B for further details. In first step 10, the steering wheel 11 is shifted to determine a vehicle's direction. During the shifting, it also accompanies with the rotation of steering wheel shaft 12 and wheel shifting shaft 14. The second step 20 follows the first step 10: a bar code 21 is attached to surround the steering wheel shaft 12 and its spin is associated with the rotation of steering wheel shaft 12. So the bar code 21 records the movement of the steering wheel shaft, then a bar code reader 22 read the code. The next is third step 30: a microprocessor 31 is conducted to the bar code reader 22 to understand the vehicle turning angle, and then to determine the best rearview mirror set 50 angle for the driver through a complicate calculation. And then to figure out the further required action of the rearview mirror 52. In the forth and last step 40, a rearview mirror driving motor 51, accepts a mirror action message from the microprocessor 31 and the motor 51 drives the rearview mirror 52 of the rearview mirror set 50 to a proper position, as referring the structure of the rearview mirror set in FIG. 4. The microprocessor 31 and the transmission motor 51 is connected by a linking wire 35. Once microprocessor 31 receives the record from bar code reader 22, it determines the required action of rearview mirror 52 and send this message to the motor 51 of the rearview mirror set 50 through linking wire 35, and then the motor 51 moves mirror 52 according to the message.

Figure 5A:
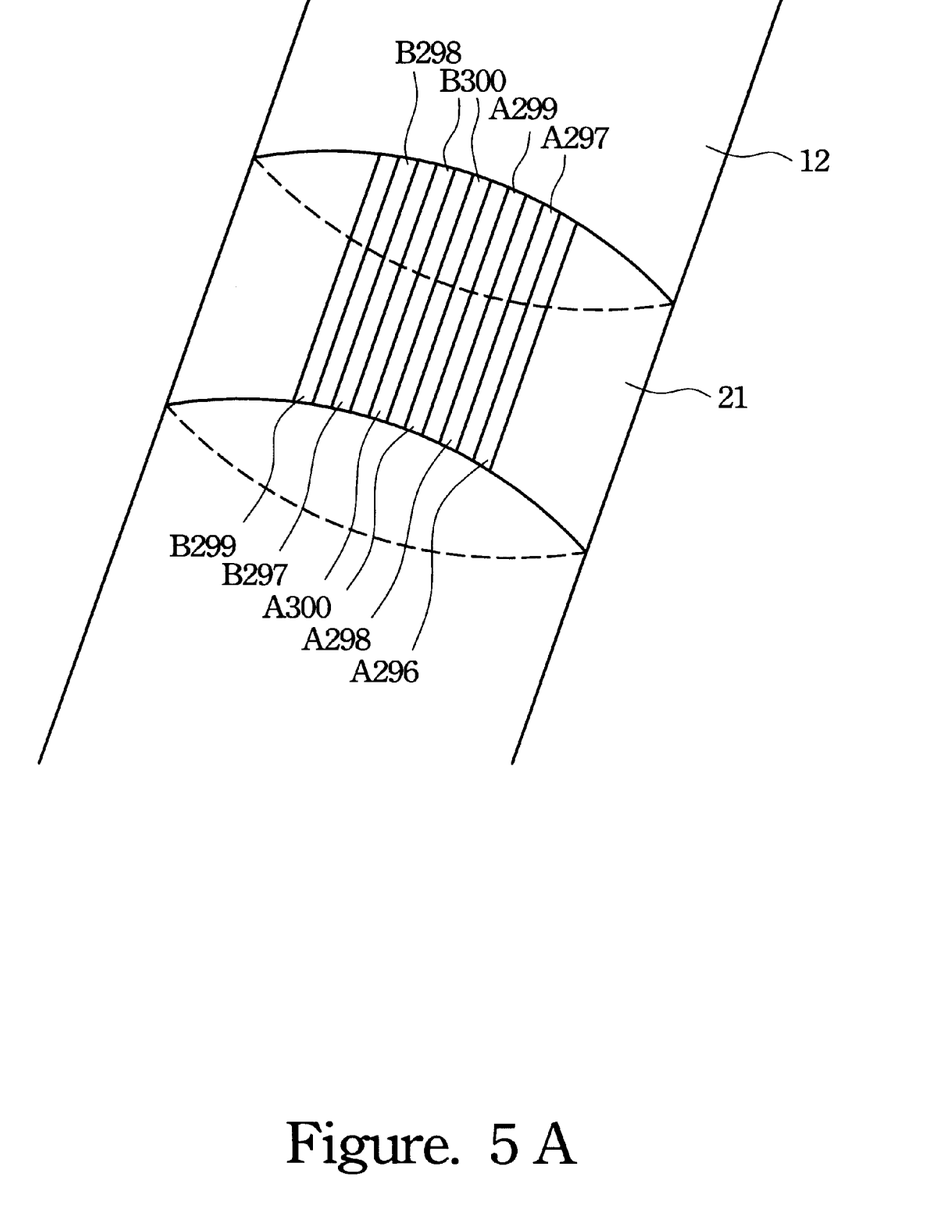
FIG. 5A is the bar-code ring apparatus of the shaft rotation measurement device, and the ring apparatus surrounds the steering wheel shaft.
Figure 5B:
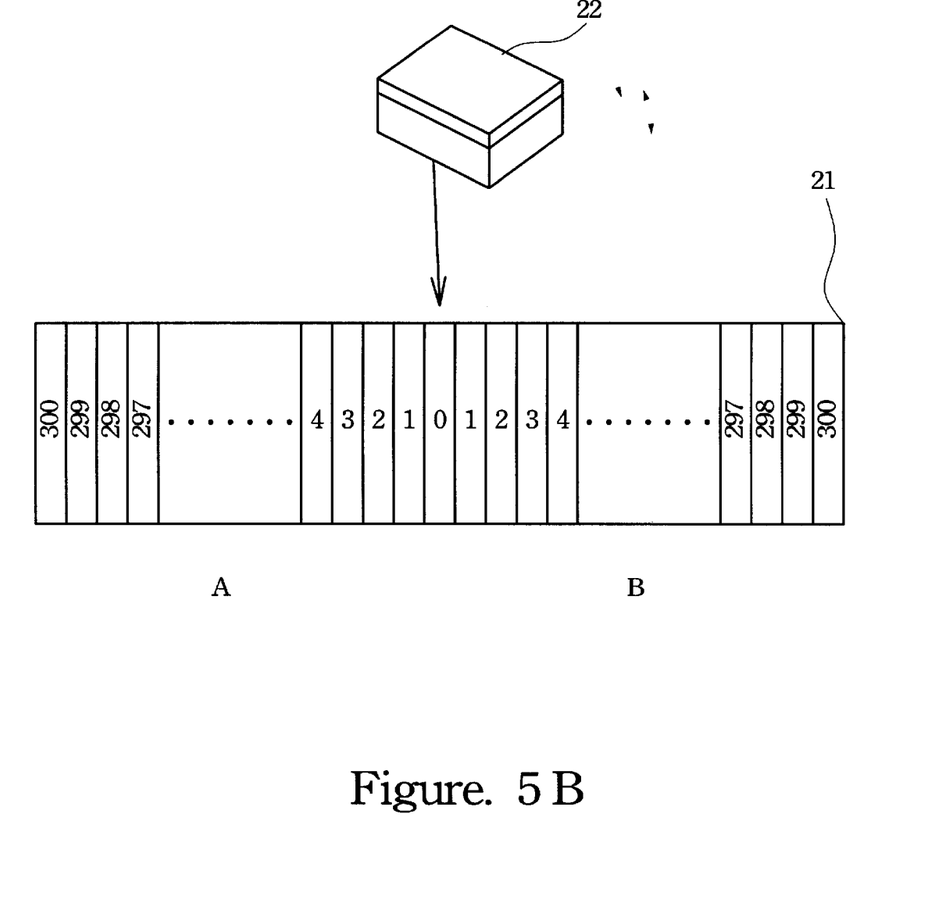
FIG. 5B is the stretched the bar-code ring apparatus of the shaft rotation measurement device.

The above embodiment of the present invention is focusing on the implement of bar code is vehicle steering wheel shaft rotation. Referring to FIG. 5A, the position of bar code ring 21 is located around a steering wheel shaft 12 or/and a wheel shifting shaft 14. FIG. 5A and FIG. 5B represent the shapes of the bar code ring before and after it stretches respectively. The middle of the bar is coded, such as "0". The left and right areas of middle "o" zone are defined as "A" region and "B" region. When the vehicle goes straight without changing direction, bar code reader 22 can record the central of the bar 21 a signal as "0", and please referring the arrow of FIG. 5B. If the steering wheel shifts for changing direction, the steering wheel shaft also spins, so the signal recorded by bar code reader 22 will be "A" region or "B" region. In both "A" and "B" region, each of them is divided to many sections, such as 300 sections per region in FIG. 5A and 5B. In "A" region, the 300 sections from close to "0" zone to far are named individually as A001, A002, A003, . . . , and A300; and similarly, the 300 sections of "B" region are also from close to "0" zone to far are named individually as B001, B002, B003, . . . , and B300.

When the steer wheel shaft rotates over half of a round, the recorded result is not restricted in only one region, but it is cross-regions. In the embodiment of the present invention, the shaft spins from left and bar code reader 22 records the signal from "0" to "A001". With more rotation, the record signal becomes A001, A002, A003 . . . , and it reaches A300 while the rotation goes to half round. If shaft left-rotation continues to over half round, the result is read from the end of "A" region, A300 to the end of "B" region, B300. And the records of further left-rotation are in order of B299, B298, and so on. If the left-rotation keeps going a entire round and more, the record is "0" again and will read the sections in "A" region.

Once the bar code reader 22 receives a record from bar code 21, it sends the record to the microprocessor 31 by for example, wire transmission. All information will be compute with memory function in the microprocessor 31, so since the "0" signal from vehicle goes straight, if the microprocessor 31 receive N times of " " signal in the order, that means the shaft has rotated "N" rounds in a certain direction. So, "0" signal need to be read N times again in opposition direction if the vehicle wants to back to go straight.

Figure 6:
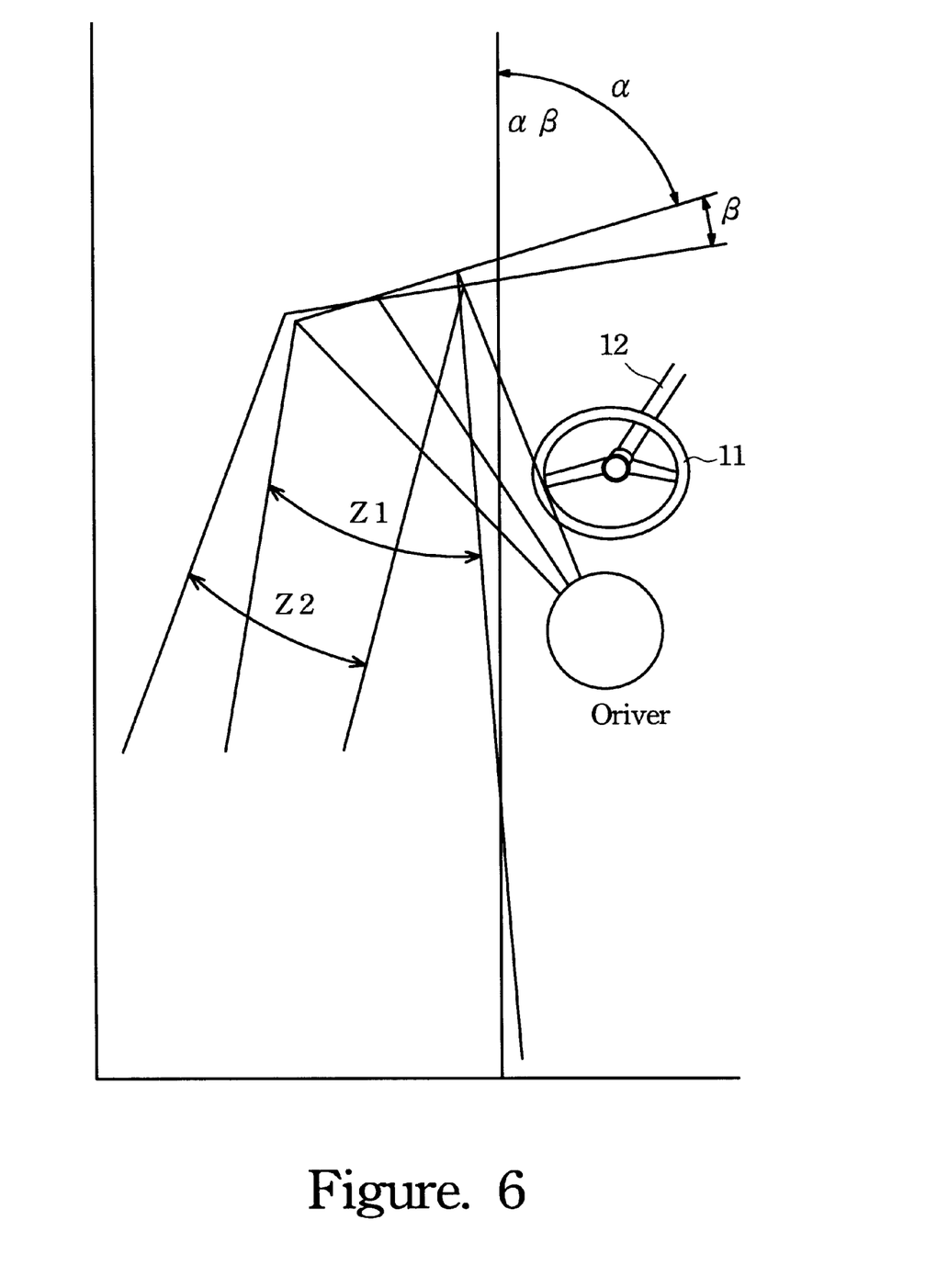
FIG. 6 illustrates different rearview from driver in different rearview mirror angles.

According to the information of bar code reader 22, the microprocessor 31 starts to calculate the best rearview angle for driver, and the theory is illustrated in FIG. 6, which shows the relationship between the rearview mirror shifting and driver's view. While a vehicle is going straight, the angle between rearview mirror 52 and vehicle body is $\alpha$, and driver's rearview through the mirror 52 is Z1; while the angle between the vehicle body and the mirror becomes $\beta$ by the automatic mirror modification device, the driver's rearview through the mirror 52 becomes Z2.

Figure 7:
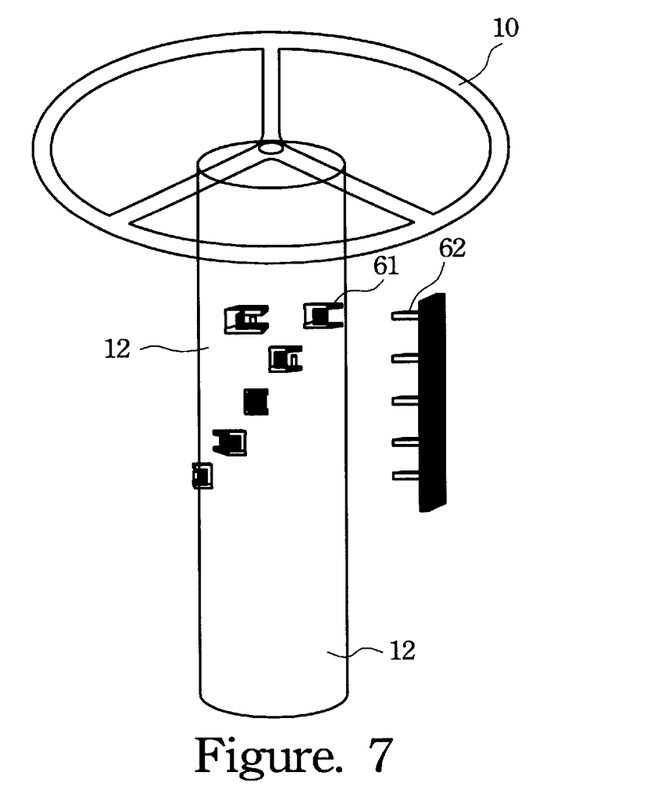
FIG. 7 is the sensor ring apparatus of the shaft/pivot rotation measurement device in an embodiment of the present invention.
Figure 8:
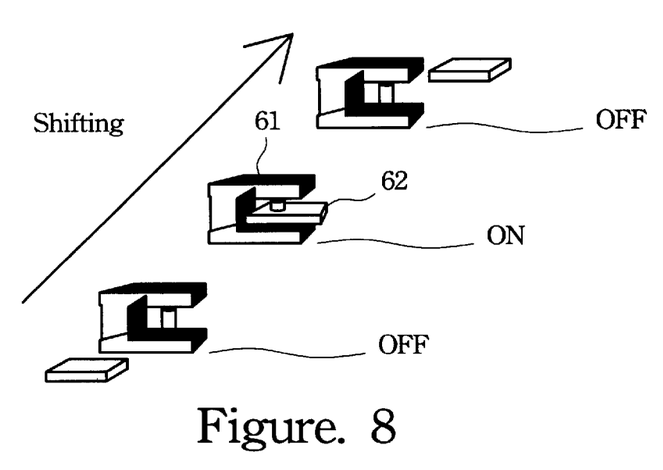
FIG. 8 is the sequence of sensors go on during vehicle turning.

Another embodiment of the present invention is the implement of light sensor for the steering wheel shaft/pivot rotation measurement device. Referring to FIG. 7, plural sensors 61 are attached along the periphery of the shaft 12 and sensor blocker 62 touches one of the sensors 61 all the time. While the shaft 12 is being rotated, the position of sensors also changes, so the sensor blocker 62 can touch various sensors 61, as shown in FIG. 8. The more rotation can lead to more touched sensor signals, which will be transmitted to microprocessor 31 for determining the best rearview mirror position.

Figure 9:
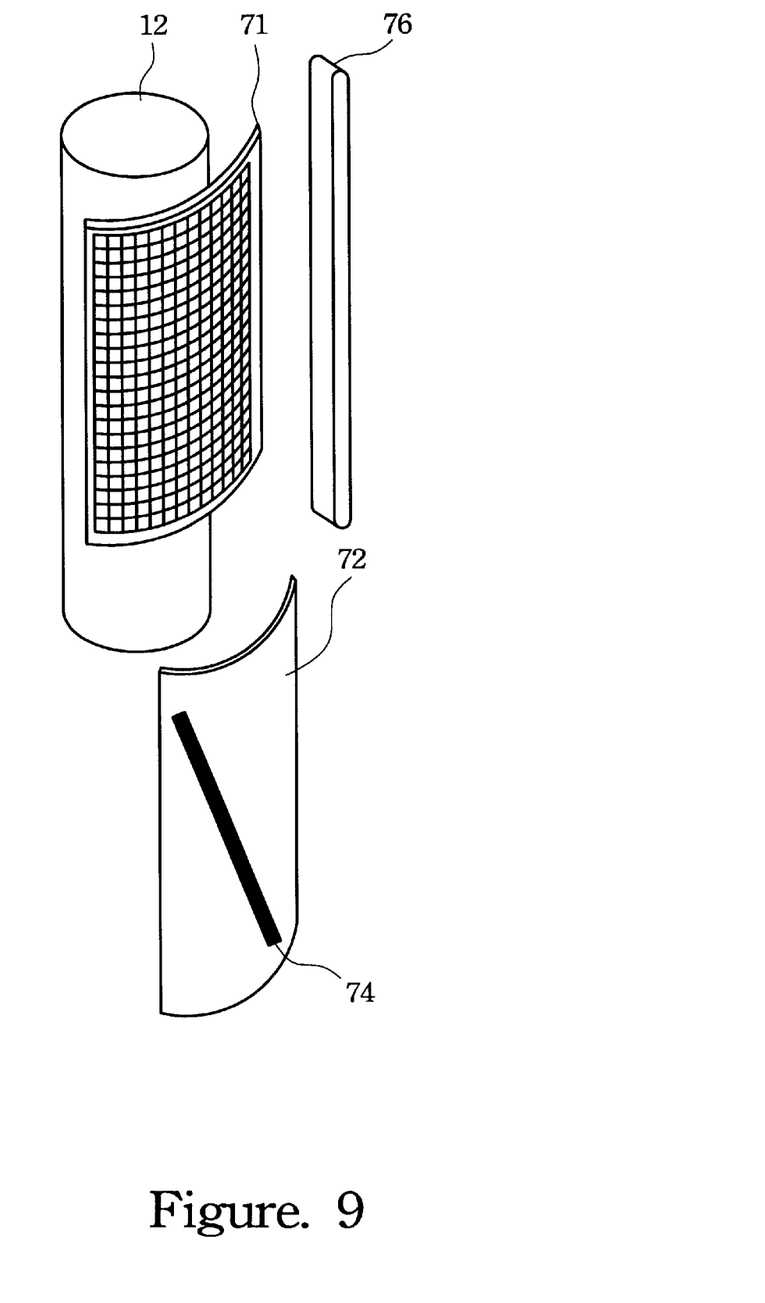
FIG. 9 is mesh light-receiver type apparatus of the shaft/pivot rotation measurement device.
Figure 10:
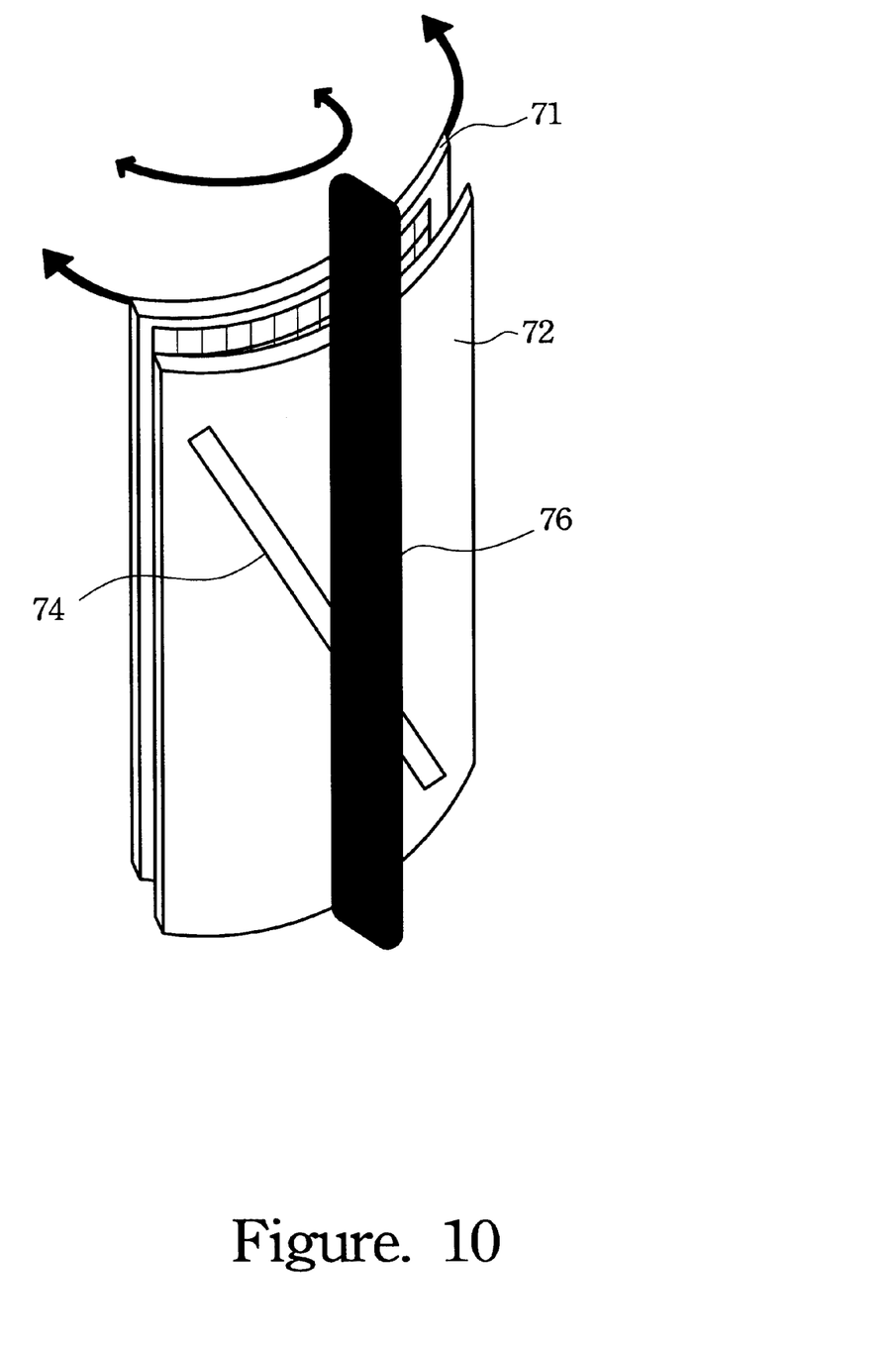
FIG. 10 is a schematically graph of utilizing mesh light-receiver type of shaft rotation measuring device in an embodiment of the present invention.

Another embodiment of the present invention is the implement of mesh light-receiver type apparatus of the shaft/pivot rotation measurement device. Referring to FIG. 9, a mesh light-receiver 71 is attached around the shaft 12 and each meshed section of the light-receiver 71 generates a signal. Outside of the mesh light-receiver, there are a light supply device 76 and a plane 72, such as a curved surface plane, with an opening or openness 74 therein between the light-receiver 71 and the light supply device 76. The shape of the opening 74 can be a diagonal line on the plane 72. The light supply device 76 and the plane 72 are fastening in a steady location and the light from light supply device 76 passes through the opening 74 and to be caught by the light-receiver 71. If the steering wheel shaft is rotating, the light-receiver is moving with it. Following its moving, various mesh section of the light-receiver catch the light, as shown in FIG. 10, and various signals will be transmitted to the microprocessor 31 for determining the best rearview mirror position.

Figure 3A:
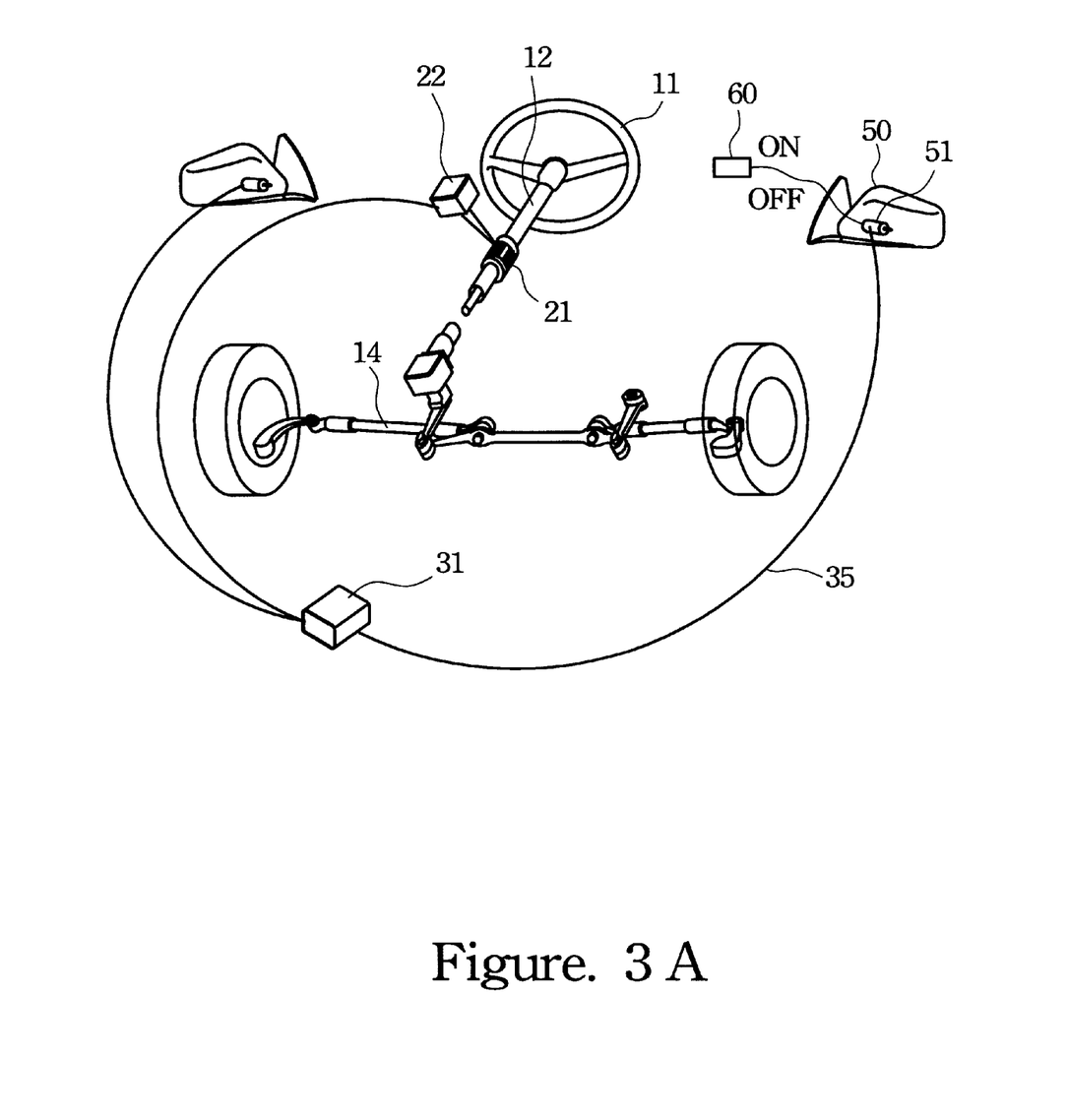
FIG. 3A is a schematically graph of utilizing bar-code type of shaft rotation measuring device in steering wheel shaft in an embodiment of the present invention.
Figure 3B:
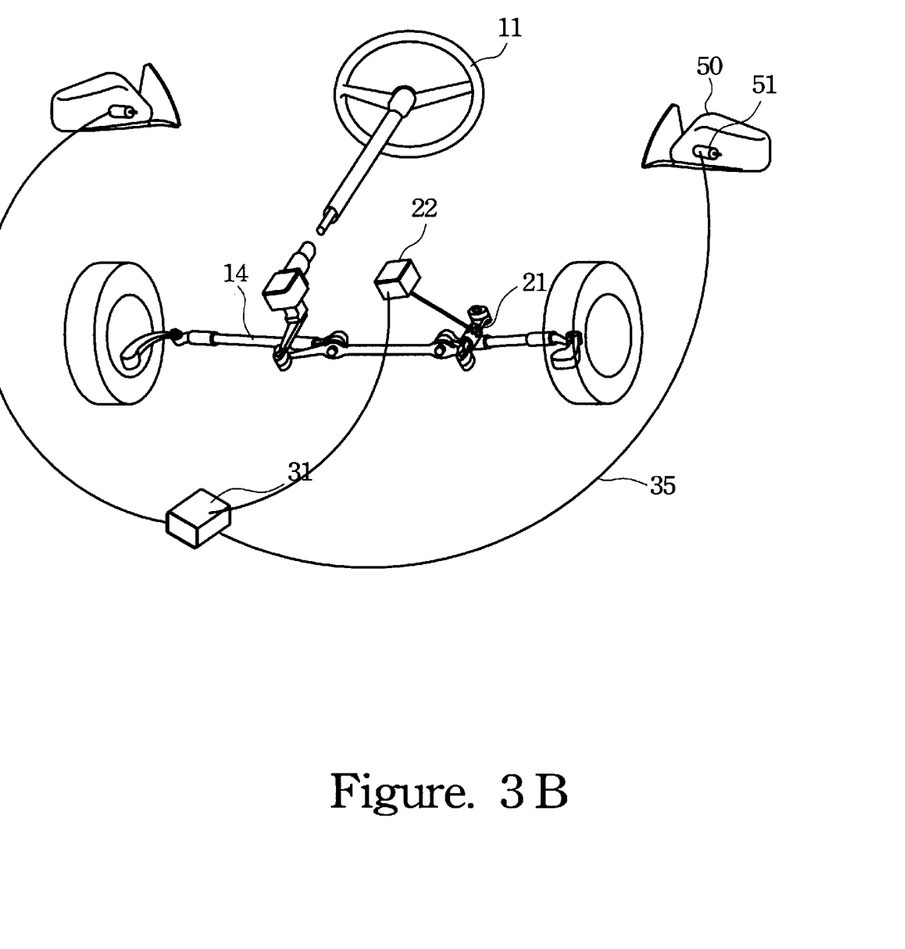
FIG. 3B is a schematically graph of utilizing bar-code type of shaft rotation measuring device in wheel shifting shaft in an embodiment of the present invention.
Figure 4:
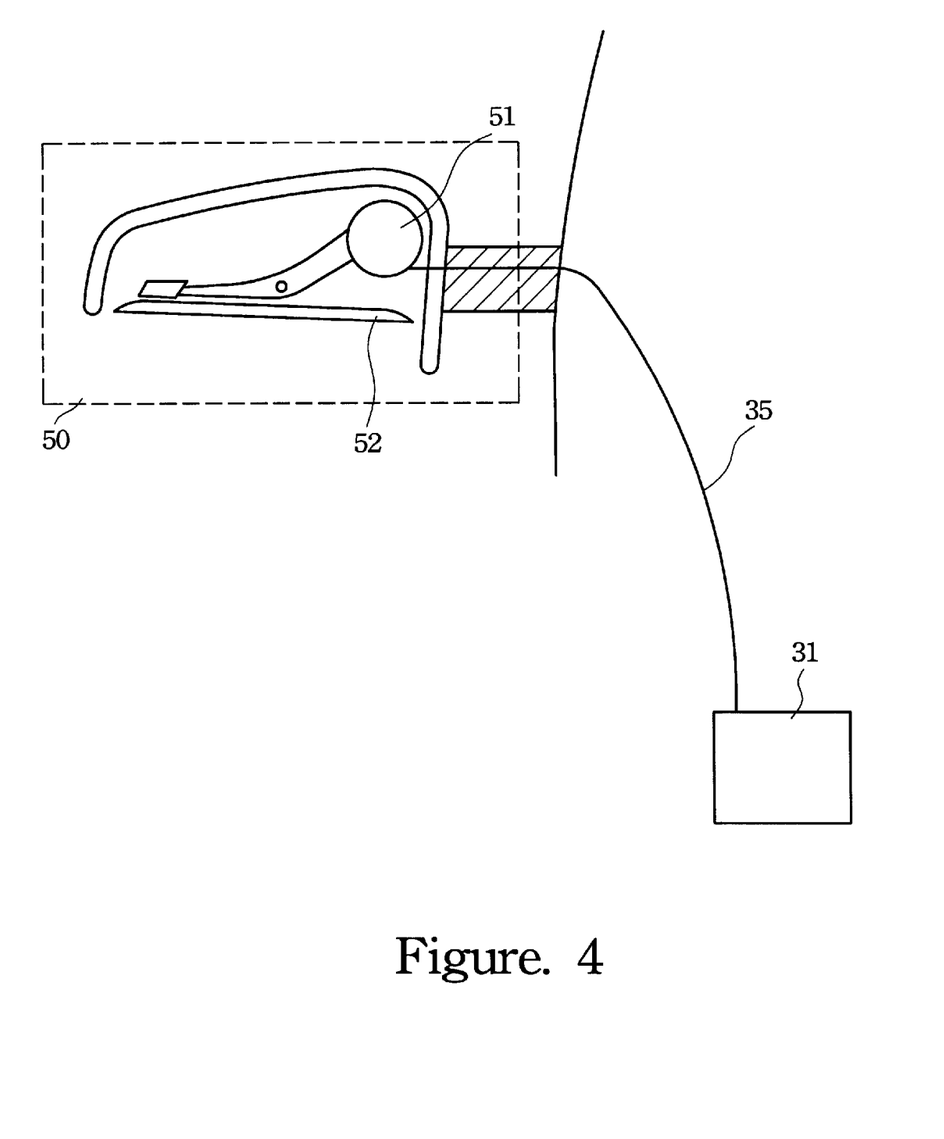
FIG. 4 is a top view of rearview mirror set.

The embodiment of the present invention can also include a switch interface 60 for the rearview mirror position modification system, as shown in FIG. 3A, and its control panel is in the vehicle and is touched easily by the driver. The switch interface connects to the rearview mirror system, for instance, the motor 51 or the microprocessor 31 (not shown), for controlling its function. If the switch is OFF for the system, the rearview mirror 52 is driven back to the original position as the vehicle goes straight first, then the position of the rearview mirror 52 is fixed and the mirror 52 does not respond for any direction changing of the vehicle.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A vehicle rearview mirror system, which understands the best
    rearview mirror angle by computing the vehicle body turning direction, said system comprising:
        a rearview mirror system switch;
        a rearview mirror, which is held on said vehicle body;
        a rotation measurement device, which further comprises:
            a bar code ring, which is attached around a steering wheel shaft or a wheel shifting shaft;
            a bar code reader, which is used for reading said bar code;
        a microprocessor, which computes a signal from said rotation measurement device for obtaining a proper adjusting angle of said rearview mirror for the best rearview of the vehicle driver; and
        a motor, which accepts a message from said microprocessor to shift said rearview mirror.

2. The system of claim 1, wherein said rotation measurement device tests a rotated range of said shaft and a test answer is transmitted to said microprocessor.

3. The system of claim 1, wherein said microprocessor calculates a turning angle of said vehicle body.

4. The system of claim 3, wherein said turning angle is analyzed by said microprocessor to decide a result of a proper movement of said rearview mirror.

5. The system of claim 4, wherein said microprocessor transmits said result to said motor.

6. The system of claim 1, wherein said motor shifts said rearview mirror to offer the best rearview of the vehicle driver by a result from said microprocessor.

7. The system of claim 1, wherein said rearview mirror system switch turns on/off said system by controlling said motor.

8. The system of claim 1, wherein said rearview mirror is driven back to original position as the vehicle goes straight if said rearview mirror system switch is OFF.

9. A vehicle rearview mirror system, which understands the best rearview mirror angle by computing the vehicle body turning direction, said system comprising:
    a rearview mirror, which is held on said vehicle body;
    a rotation measurement device, which further comprises:
        a bar code ring, which is attached around a steering wheel shaft or a wheel shifting shaft;
        a bar code reader, which is used for reading said bar code;
    a microprocessor, which computes a signal from said rotation measurement device for obtaining a proper adjusting angle of said rearview mirror for the best rearview of the vehicle driver; and
    a motor, which accepts a message from said microprocessor to shift said rearview mirror.

10. The system of claim 9, wherein said rotation measurement device tests a rotated range of said shaft and a test answer is transmitted to said microprocessor.

11. The system of claim 9, wherein said microprocessor calculates a turning angle of said vehicle body.

12. The system of claim 11, wherein said turning angle is analyzed by said microprocessor to decide a result of the proper movement of said rearview mirror.

13. The system of claim 12, wherein said microprocessor transmits said result to said motor.

14. The system of claim 9, wherein said motor shifts said rearview mirror to offer the best rearview of the vehicle driver by a result from said microprocessor.

15. The system of claim 9, wherein said rearview mirror system has a switch, which turns on/off said system by controlling said motor.

16. The system of claim 15, wherein said rearview mirror is driven back to original position as the vehicle goes straight if said switch of said rearview mirror system is OFF.

17. A vehicle rearview mirror system, which understands the best rearview mirror angle by computing the vehicle body turning direction, said system comprising:
    a rearview mirror, which is held on said vehicle body;
    a rotation measurement device, which further comprises:
        a plurality of sensors, which are attached around a steering wheel shaft;
        a sensor blocker, which touches said various sensors if said steering wheel shaft is rotated;
    a microprocessor, which computes a signal from said rotation measurement device for obtaining a proper adjusting angle of said rearview mirror for the best rearview of the vehicle driver; and
    a motor, which accepts a message from said microprocessor to shift said rearview mirror.

18. The system of claim 17, wherein said rotation measurement device tests a rotated range of said shaft and a test answer is transmitted to said microprocessor.

19. The system of claim 17, wherein said microprocessor calculates a turning angle of said vehicle body.

20. The system of claim 19, wherein said turning angle is analyzed by said microprocessor to decide a result of the proper movement of said rearview mirror.

21. The system of claim 20, wherein said microprocessor transmits said result to said motor.

22. The system of claim 17, wherein said motor shifts said rearview mirror to offer the best rearview of the vehicle driver by a result from said microprocessor.

23. The system of claim 17, wherein said rearview mirror system has a switch, which turns on/off said system by controlling said motor.

24. The system of claim 23, wherein said rearview mirror is driven back to original position as the vehicle goes straight if said switch of said rearview mirror system is OFF.

25. A vehicle rearview mirror system, which understands the best rearview mirror angle by computing the vehicle body turning direction, said system comprising:
    a rearview mirror, which is held on said vehicle body;
    a rotation measurement device, which further comprises:
        a mesh light-receiver, which is attached around a steering wheel shaft;
        a light supply device, which projects light to said mesh light-receiver;
        a plane with an opening therein, the light from said light supply device passes through said opening to project to said light-receiver;
    a microprocessor, which computes a signal from said rotation measurement device for obtaining a proper adjusting angle of said rearview mirror for the best rearview of the vehicle driver; and
    a motor, which accepts a message from said microprocessor to shift said rearview mirror.

26. The system of claim 25, wherein said light supply device projects light through said opening of said plane to various sections of said mesh light-receiver.

27. The system of claim 25, wherein said rotation measurement device tests a rotated range of said shaft and a test answer is transmitted to said microprocessor.

28. The system of claim 25, wherein said microprocessor calculates a turning angle of said vehicle body.

29. The system of claim 28, wherein said turning angle is analyzed by said microprocessor to decide a result of the proper movement of said rearview mirror.

30. The system of claim 29, wherein said microprocessor transmits said result to said motor.

31. The system of claim 25, wherein said motor shifts said rearview mirror to offer the best rearview of the vehicle driver by a result from said microprocessor.

32. The system of claim 25, wherein said rearview mirror system has a switch, which turns on/off said system by controlling said motor.

33. The system of claim 32, wherein said rearview mirror is driven back to original position as the vehicle goes straight if said switch of said rearview mirror system is OFF.

* * * * *